United States Patent
Cartagena et al.

(10) Patent No.: US 11,062,100 B1
(45) Date of Patent: Jul. 13, 2021

(54) SYSTEMS AND METHODS TO DETERMINE A MACHINE-READABLE OPTICAL CODE BASED ON SCREEN-CAPTURED VIDEO

(71) Applicant: Outlayr, Inc., Los Angeles, CA (US)

(72) Inventors: Carl Michael Cartagena, Santa Monica, CA (US); Mark Jered Verrico, Round Rock, TX (US); Jonathen Christopher Wong, San Dimas, CA (US)

(73) Assignee: Outlayr, Inc., Los Angeles, CA (US)

( * ) Notice: Subject to any disclaimer, the term of this patent is extended or adjusted under 35 U.S.C. 154(b) by 0 days.

(21) Appl. No.: 16/988,512

(22) Filed: Aug. 7, 2020

Related U.S. Application Data

(60) Provisional application No. 62/885,077, filed on Aug. 9, 2019.

(51) Int. Cl.
| | |
|---|---|
| *G06K 7/10* | (2006.01) |
| *G06F 3/0488* | (2013.01) |
| *H04N 5/76* | (2006.01) |
| *G06K 7/14* | (2006.01) |
| *G06F 3/0484* | (2013.01) |

(52) U.S. Cl.
CPC ..... *G06K 7/10712* (2013.01); *G06F 3/04886* (2013.01); *G06K 7/1413* (2013.01); *G06K 7/1417* (2013.01); *H04N 5/76* (2013.01); *G06F 3/04842* (2013.01); *G06F 3/04845* (2013.01)

(58) Field of Classification Search
CPC ............ G06F 3/04886; G06F 3/04842; G06F 3/04845; H04N 4/76; G06K 7/10712; G06K 7/1413; G06K 7/1417
See application file for complete search history.

(56) References Cited

U.S. PATENT DOCUMENTS

| | | | |
|---|---|---|---|
| 10,237,583 B1 * | 3/2019 | Allen | G06F 16/9554 |
| 2012/0085819 A1 * | 4/2012 | Choi | H04N 21/44008 235/375 |
| 2015/0113557 A1 * | 4/2015 | Kim | H04N 1/00307 725/32 |
| 2019/0057614 A1 * | 2/2019 | Reilly | H04B 1/3827 |
| 2019/0377476 A1 * | 12/2019 | Wong | G06F 3/04892 |

* cited by examiner

*Primary Examiner* — Laura A Gudorf
(74) *Attorney, Agent, or Firm* — Esplin & Associates, PC

(57) ABSTRACT

Systems and methods configured to determine a machine-readable optical code based on screen-captured video are disclosed. Exemplary implementations may: receive, via a user interface of a client computing platform, an indication to begin a screen-captured video; initiate, based on the indication, the screen-captured video; effectuate an image decoding machine configured to parse and decode images and/or the video frames for information embedded into the images and/or the video frames to: parse the video frames for a machine-readable optical code; for individual ones of the video frames with the machine-readable optical code, extract embedded information from the machine-readable optical code; and decode the embedded information for metadata; and effectuate, via the user interface, presentation of information derived from the metadata.

18 Claims, 4 Drawing Sheets

SYSTEMS AND METHODS TO DETERMINE A MACHINE-READABLE OPTICAL CODE BASED ON SCREEN-CAPTURED VIDEO

FIELD OF THE DISCLOSURE

The present disclosure relates to systems and methods to determine a machine-readable optical code based on screen-captured video.

BACKGROUND

Existing methods of capturing an image to extract embedded information from an electronic device (e.g., smartphone, tablet) may be limited to the use of a physical camera of the electronic device as the primary method of image capture. Such capturing involves several user interactions which tend to interrupt or obstruct presently ongoing activities, such as when a user is watching a video and does not want to be interrupted. The existing methods merely capturing images with the physical camera. However, this is limited and does not allow the user to capture images with embedded information on the electronic device screen they are currently viewing.

SUMMARY

One aspect of the present disclosure relates to a system configured to determine a machine-readable optical code based on screen-captured video displayed on a screen of a client computing platform. The screen-captured video may be initiated by a user associated with the client computing platform. Video frames of the screen-captured video may be parsed for a machine-readable optical code of which embedded information may be extracted from and decoded for metadata. Thus, the system removes the requirement of activating a physical camera of the client computing platform to capture an image of the machine-readable optical code external from the client computing platform and/or screenshotting via the client computing platform for a single image to extract and decode the embedded information.

One aspect of the present disclosure relates to a system configured to determine a machine-readable optical code based on screen-captured video. The system may include one or more hardware processors configured by machine-readable instructions, an image decoding machine, and/or other components. The machine-readable instructions may include one or more instruction components. The instruction components may include computer program components. The instruction components may include one or more of indication capture component, analysis component, utilization component, and/or other instruction components.

The capture component may be configured to receive an indication to begin a screen-captured video. The indication to begin may be received via a user interface of a client computing platform. The screen-captured video may record content displayed on a screen of the client computing platform. The screen-captured video may include video frames of the content and/or other information. The capture component may be configured to initiate the screen-captured video. The initiation of the screen-captured video may be based on the indication.

The analysis component may be configured to effectuate an image decoding machine to perform. The image decoding machine may be configured to parse and decode images and/or the video frames for information embedded into the images and/or the video frames.

As such, the image decoding machine may be configured to parse the video frames for a machine-readable optical code. The image decoding machine may be configured to extract embedded information from the machine-readable optical code. Such extraction may be performed for individual ones of the video frames with the machine-readable optical code. The image decoding machine may be configured to decode the embedded information for metadata.

The utilization component may be configured to effectuate, via the user interface, presentation of information derived from the metadata. In some implementations, the information derived from the metadata may include the metadata itself.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

One aspect of the present disclosure relates to the ability of capturing a screen of an electronic device with minimal user interaction, without activating a physical camera of the electronic device, and thereby expanding the purpose and functionality of data collection when using the electronic device.

Figure 1:
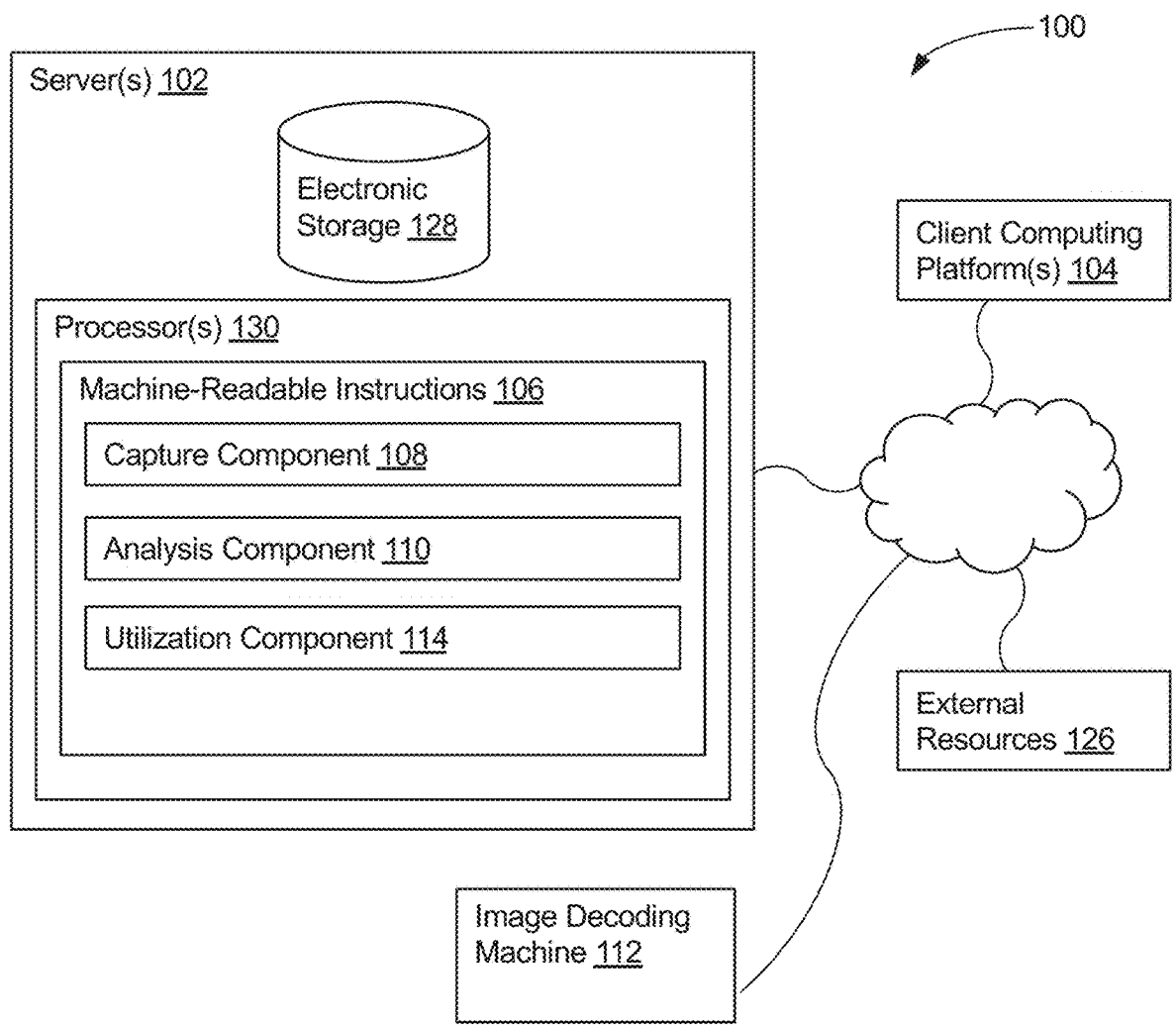
FIG. 1 illustrates a system configured to determine a machine-readable optical code based on screen-captured video, in accordance with one or more implementations.

FIG. 1 illustrates a system 100 configured to determine a machine-readable optical code based on screen-captured video, in accordance with one or more implementations. In some implementations, system 100 may include one or more servers 102, an image decoding machine 112, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of indication capture component 108, analysis component 110, utilization component 114, and/or other instruction components.

Capture component 108 may be configured to receive an indication to begin a screen-captured video. The indication to begin may be received via a user interface of client computing platform 104. The indication to begin the screen-captured video may include user interaction by a user associated with the client computing platform 104 with one or more user interface elements. The user interface may include the one or more user interface elements to facilitate the user interface with the user interface. The user interface element may include a button, a virtual button, a draggable virtual button, a slider, and/or other elements configured to facilitate with user interaction. As used herein, the word "draggable" may refer to an interface feature, such as the virtual button, that may be repositioned on the screen/display (e.g., screen 302 of FIG. 3, image display (1) of FIG. 4) manually, for example, by "dragging." The user interaction may include selection of the user interface element, dragging of the user interface element from a first point to a second point, pressing of the user interface element, holding down the user interface element, and/or other user interaction by the user. The first point may be different from the second point. For example, the user may drag the slider or the virtual button from the first point to the second point to initiate the screen-captured video.

The screen-captured video may record content displayed on a screen of the client computing platform 104. The screen-captured video may include video frames of the content, and/or other information. A video frame may be a still single image of which comprises a part of the screen-captured video and where a plurality of video frames comprises the screen-captured video. The video frames may include visual information and/or other information. The visual information captured may include the content on the entire screen of client computing platform 104, and/or a user-selected portion of the screen (e.g., a portion appearing at or near the virtual button (e.g., see user interface element 308*a* of FIG. 3)). Upon the initiation, the screen-captured video may record for a pre-defined amount of time. As such, the screen-captured video may terminate after the pre-defined amount of time. By way of non-limiting example, the pre-defined amount of time may be 5 second, 10 second, 15 seconds, or another amount of time. In some implementations, the pre-defined amount of time may be modified by the user, an administrative user of system 100, and/or other users.

Based on the indication, capture component 108 may be configured to initiate the screen-captured video. One or more of the video frames of the screen-captured video may include one or more machine-readable optical codes. Machine-readable optical codes may include, by way of non-limiting example, a Quick Response (QR) code, a bar code, a numerical code, an alphabetical code, an alpha-numeric code, and/or other machine-readable optical codes. In some implementations, the screen-captured video may be stored to electronic storage 128.

In some implementations, capture component 108 may be configured to receive a second indication to terminate the screen-captured video. The second indication may be received via the user interface. The second indication may include the user interaction with the user interface element. By way of non-limiting example, the second indication may include dragging the user interface element (e.g., the slider, the virtual button) from the second point to the first point. As another example, the second indication may include selection of the virtual button to terminate the screen-capture video. As another example, the user may press and hold the virtual button to initiate the screen-captured video and release the virtual button to terminate the screen-captured video. Based on the second indication, capture component 108 may be configured to terminate the screen-captured video. Termination of the screen-captured video may permit the screen-captured video to be transmitted, transferred, or otherwise communicated, and/or stored to electronic storage 128.

In some implementations, analysis component 110 may be configured to transmit, transfer, and/or otherwise communicate the screen-captured video to an external resource (e.g., image decoding machine 112) and/or component. Analysis component 110 may be configured to effectuate performance of image decoding machine 112. Image decoding machine 112 may be configured to parse and decode images and/or the video frames for information embedded into the images and/or the video frames. In some implementations, image decoding machine 112 may be configured to receive the images and/or the video frames of the screen-captured video.

In some implementations, image decoding machine 112 may be integrated or otherwise a part of server(s) 102. In some implementations, image decoding machine 112 and server(s) 102 may be operatively linked via one or more electronic communication links. As such, the server(s) 102 and image decoding machine 112 may communicate via a network such as the Internet and/or other networks. Image decoding machine 112 may include, without limitation, a machine algorithm to decode the images and/or video frames for (embedded) information.

Image decoding machine 112 may be configured to parse the video frames for the one or more machine-readable optical codes. Parsing the video frames may include separating individual ones of the video frames from the screen-captured video and/or other video frames. In some implementations, two or more of the video frames may include at least a portion of a particular machine-readable optical code. The two or more of the video frames may be combined into a single image of which include particular machine-readable optical code as a whole. In some implementations, the one or more video frames and/or images with the one or more machine-readable optical codes may be selected or otherwise identified from other video frames and images without the one or more machine-readable codes.

Image decoding machine 112 may be configured to extract embedded information from the machine-readable optical code. The extraction may be performed for individual ones of the video frames and/or images with the machine-readable optical code. The embedded information may include metadata and/or other information interpretable by a human and/or a machine (e.g. image decoding machine 112). By way of non-limiting illustration, the metadata may include values to an author, a creator, an owner, times and/or dates (e.g., date created, date uploaded, date modified, date manufactured), a file size, a merchant, a website, a location, and/or other metadata.

Image decoding machine 112 may be configured to decode the embedded information for the metadata. Decoding may be performed for the for individual ones of the video frames and/or images with the machine-readable optical code and the embedded information had been extracted from. Decoding the embedded information for the metadata may include translating the embedded information into human-readable information and/or readable by a particular machine. In some implementations, the metadata may be human-readable and/or readable by other machines.

Utilization component 114 may be configured to effectuate, via the user interface, presentation of information derived from the metadata. The information derived from the metadata may include the metadata itself. The information derived from the metadata may facilitate a transaction, authentication, access (e.g., virtual access, physical access (e.g., to a facility), etc.), identification (e.g., government identification, work identification, security identification), configuration of a device (e.g., client computing platform 104), providing information (e.g., coupons, event details, contact information, product information, offer information, location information, social network pages, etc.), and/or other actions.

In some implementations, the information derived from the metadata may include a prompt for user interaction from a user associated with the client computing platform. For example, the prompt may include a hyperlink, one or more secondary user interface elements, text, and/or other information. The one or more secondary user interface elements may facilitate inputting user input from the user. The one or more secondary user interface elements may include a dropdown menu, text-input fields, radio buttons, check boxes, and/or other secondary user interface elements.

In some implementations, utilization component 114 may be configured to effectuate communication of the information derived from the metadata to a second client computing platform 104 different from the client computing platform 104. The communication to second client computing platform 104 may facilitate the transaction, the authentication, the access, the identification, the configuration of the device, the providing information, and/or other actions.

Figure 3:
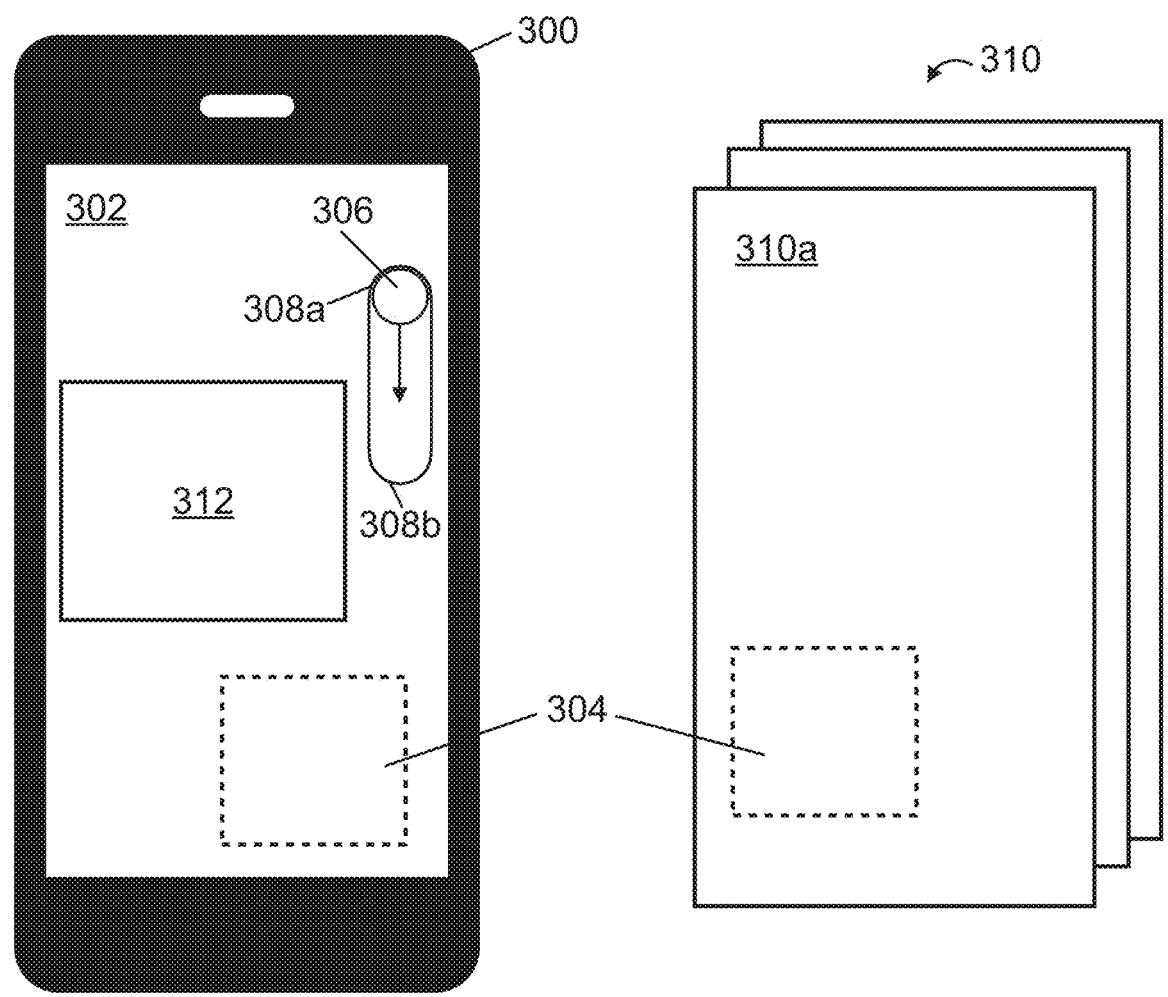
FIG. 3 illustrates an example implementation of the system configured to determine a machine-readable optical code based on screen-captured video, in accordance with one or more implementations.

FIG. 3 may illustrate an example implementation of the system configured to determine a machine-readable optical code based on screen-captured video, in accordance with one or more implementations. FIG. 3 may illustrate a screen 302 of a smartphone 300. Screen 302 may display a machine-readable optical code 304 and a user interface element 306. A user may drag the user interface element 306 from a point 308*a* to a point 308*b* to initiate a screen-captured video. The screen-captured video may include video frames 310. Video frames 310 may be parsed (by image decoding machine 312 of FIG. 1) for machine-readable optical code 304. Video frames 310 may include video frame 310*a*. Video frame 310*a* may include machine-readable optical code 304 of which embedded information may be extracted from. The embedded information may be subsequently decoded (by image decoding machine 312) for metadata. Derived information 312 from the metadata may be presented on screen 302.

Figure 4:
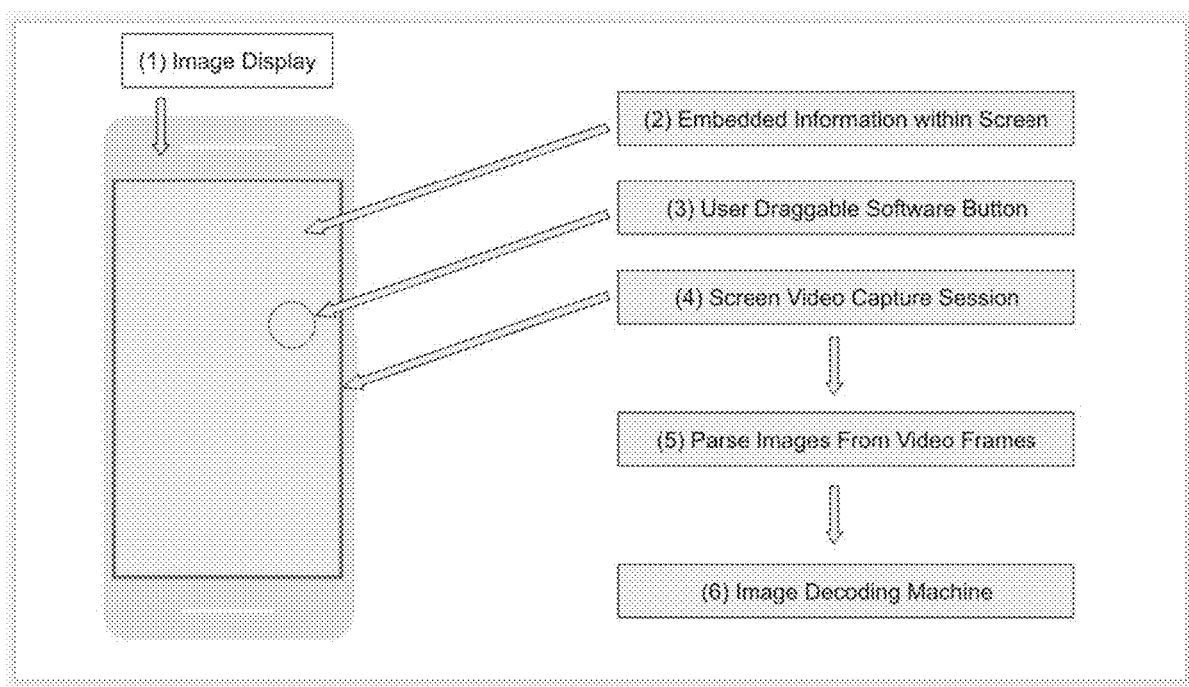
FIG. 4 illustrates an example implementation of the system configured to determine a machine-readable optical code based on screen-captured video, in accordance with one or more implementations.

FIG. 4 may illustrate an example implementation of the system configured to determine a machine-readable optical code based on screen-captured video, in accordance with one or more implementations. FIG. 4 may illustrate various elements of a user draggable button-based screen capturing method of the present disclosure and may be related in the following exemplary fashion. It is not intended to limit the scope or nature of the relationships between the various elements and the following and/or previous examples are presented as illustrative examples only. All content on a screen or image display (1) may be analyzed by an image decoding machine (6) by way of a user draggable software button (3) (e.g., a user interface element) which will initiate a screen video capture session (4). The user draggable software button (3) may initiate screen video capture session (4) to subsequently parse images from video frames (5) for image decoding machine (6) (i.e., the same as or similar to image decoding machine 112 of FIG. 1) to decode each of the images for embedded information (2).

Referring to back FIG. 1, in some implementations, server(s) 102, client computing platform(s) 104, image decoding machine 112, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, image decoding machine 112, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 114, and/or other components and/or some or all functionality of image decoding machine 112. Processor(s) 130 may be configured to execute components 108, 110, and/or 114, other components, and/or some or all functionality of image decoding machine 112 by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 114 are illustrated in FIG. 1 as being implemented within a single processing unit, in implementations in which processor(s) 130 includes multiple processing units, one or more of components 108, 110, and/or 114 may be implemented remotely from the other components. The description of the functionality provided by the different components 108, 110, 114, and/or image decoding machine 112 described below is for illustrative purposes, and is not intended to be limiting, as any of components 108, 110, 114, and/or image decoding machine 112 may provide more or less functionality than is described. For example, one or more of components 108, 110, 114, and/or image decoding machine 112 may be eliminated, and some or all of its functionality may be provided by other ones of components 108, 110, 114, and/or image decoding machine 112. As another example, processor(s) 130 may be configured to execute one or more additional components that may perform some or all of the functionality attributed below to one of components 108, 110, 114, and/or image decoding machine 112.

Figure 2:
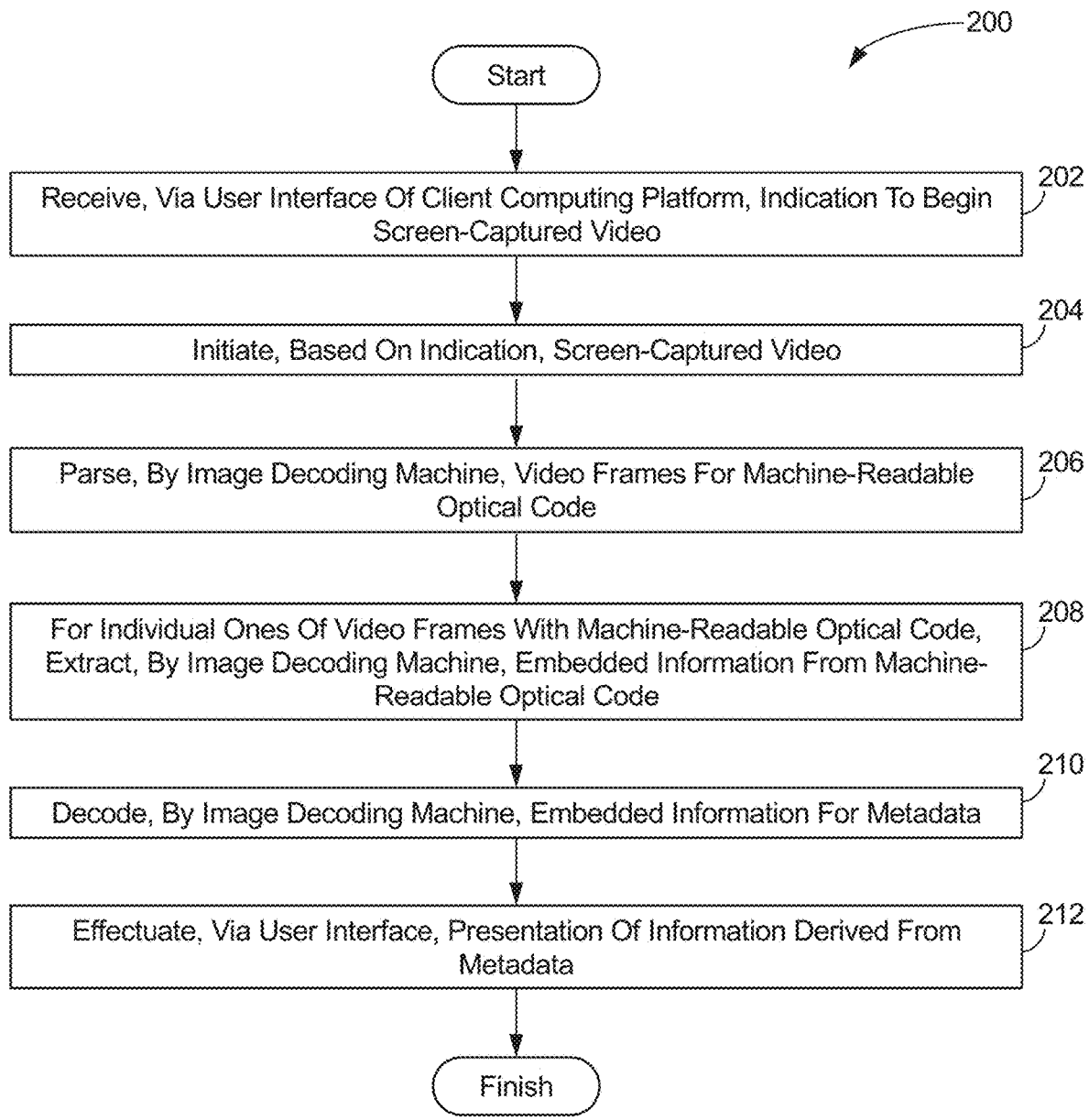
FIG. 2 illustrates a method configured to determine a machine-readable optical code based on screen-captured video, in accordance with one or more implementations.

FIG. 2 illustrates a method 200 configured to determine a machine-readable optical code based on screen-captured video, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving, via a user interface of a client computing platform, an indication to begin a screen-captured video. The screen-captured video records content displayed on a screen of the client computing platform. The screen-captured video may include video frames of the content. Operation 202 may be performed by one or more hardware processors configured by machine-readable instructions including a component that is the same as or similar to capture component 108, in accordance with one or more implementations.

An operation 204 may include initiating, based on the indication, the screen-captured video. Operation 204 may be performed by one or more hardware processors configured by machine-readable instructions including a component that is the same as or similar to capture component 108, in accordance with one or more implementations.

An operation 206 may include parsing, by an image decoding machine, the video frames for a machine-readable optical code. The image decoding machine may be configured to parse and decode images and/or the video frames for information embedded into the images and/or the video frames. Operation 206 may be performed by one or more hardware processors configured by machine-readable instructions including a component that is the same as or similar to analysis component 110 and image decoding machine 112, in accordance with one or more implementations.

An operation 208 may include extracting, by the image decoding machine, embedded information from the machine-readable optical code. The extraction may be performed for individual ones of the video frames with the machine-readable optical code. Operation 208 may be performed by a component that is the same as or similar to image decoding machine 112, in accordance with one or more implementations.

An operation 210 may include decoding, by the image decoding machine, the embedded information for metadata. Operation 210 may be performed by a component that is the same as or similar to image decoding machine 112, in accordance with one or more implementations.

An operation 212 may include effectuating, via the user interface, presentation of information derived from the metadata. Operation 212 may be performed by one or more hardware processors configured by machine-readable instructions including a component that is the same as or similar to presentation utilization component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to determine a machine-readable optical code based on screen-captured video, the system comprising:
   image decoding machine configured to parse and decode images and/or video frames for information embedded into the images and/or video frames; and
   one or more processor configured by machine-readable instructions to:
      receive, via a user interface of a client computing platform, an indication to begin a screen-captured video, wherein the screen-captured video records content displayed on a screen of the client computing platform, wherein the screen-captured video includes video frames of the content;
      initiate, based on the indication, the screen-captured video;
      receive, via the user interface, a second indication to terminate the screen-captured video;
      terminate, based on the second indication, the screen-captured video;
      effectuate, responsive to the receipt of the second indication to terminate, the image decoding machine to:
         (i) parse the video frames for a machine-readable optical code;
         (ii) for individual ones of the video frames with the machine-readable optical code, extract embedded information from the machine-readable optical code; and
         (iii) decode the embedded information for metadata; and
      effectuate, via the user interface, presentation of information derived from the metadata.

2. The system of claim 1, wherein the one or more processor configured by the machine-readable instructions to:
   effectuate communication of the information derived from the metadata to a second client computing platform different from the client computing platform.

3. The system of claim 1, wherein the indication to begin the screen-captured video includes user interaction by a user associated with the client computing platform with a user interface element.

4. The system of claim 3, wherein the user interaction includes dragging of the user interface element from a first point to a second point, wherein the first point is different from the second point.

5. The system of claim 3, wherein the user interface element includes a slider.

6. The system of claim 1, wherein the second indication includes the user interaction with the user interface element.

7. The system of claim 6, wherein the second indication includes dragging the user interface element from the second point to the first point.

8. The system of claim 1, wherein the screen-captured video records for a pre-defined amount of time so that the screen-captured video terminates after the pre-defined amount of time.

9. The system of claim 1, wherein the information derived from the metadata includes a prompt for user interaction from a user associated with the client computing platform.

10. A method to determine a machine-readable optical code based on screen-captured video, the method comprising:
    receiving, via a user interface of a client computing platform, an indication to begin a screen-captured video, wherein the screen-captured video records content displayed on a screen of the client computing platform, wherein the screen-captured video includes video frames of the content;
    initiating, based on the indication, the screen-captured video;
    receiving, via the user interface, a second indication to terminate the screen-captured video;
    terminating, based on the second indication, the screen-captured video;
    responsive to the receipt of the second indication to terminate:
       (i) parsing, by an image decoding machine, the video frames for a machine-readable optical code, wherein the image decoding machine is configured to parse and decode images and/or the video frames for information embedded into the images and/or the video frames;
       (ii) for individual ones of the video frames with the machine-readable optical code, extracting, by the image decoding machine, embedded information from the machine-readable optical code; and
       (iii) decoding, by the image decoding machine, the embedded information for metadata; and
    effectuating, via the user interface, presentation of information derived from the metadata.

11. The method of claim 10, further comprising:
    effectuating communication of the information derived from the metadata to a second client computing platform different from the client computing platform.

12. The method of claim 10, wherein the indication to begin the screen-captured video includes user interaction by a user associated with the client computing platform with a user interface element.

13. The method of claim 12, wherein the user interaction includes dragging of the user interface element from a first point to a second point, wherein the first point is different from the second point.

14. The method of claim 12, wherein the user interface element includes a slider.

15. The method of claim 10, wherein the second indication includes the user interaction with the user interface element.

16. The method of claim 15, wherein the second indication includes dragging the user interface element from the second point to the first point.

17. The method of claim 10, wherein the screen-captured video records for a pre-defined amount of time so that the screen-captured video terminates after the pre-defined amount of time.

18. The method of claim 10, wherein the information derived from the metadata includes a prompt for user interaction from a user associated with the client computing platform.

* * * * *